United States Patent [19]

Grant

[11] 4,382,067
[45] May 3, 1983

[54] SOLVENT EXTRACTION OF PLATINUM GROUP METALS

[75] Inventor: Richard A. Grant, Uxbridge, England

[73] Assignee: Matthey Rustenburg Refiners (Pty.) Ltd., Johannesburg, South Africa

[21] Appl. No.: 338,054

[22] Filed: Jan. 8, 1982

Related U.S. Application Data

[63] Continuation of Ser. No. 213,489, Dec. 5, 1980, abandoned.

[30] Foreign Application Priority Data

Dec. 17, 1979 [GB] United Kingdom ............... 7943376

[51] Int. Cl.$^3$ ............................................. C01G 55/00
[52] U.S. Cl. .................................... 423/22; 75/101 BE
[58] Field of Search ....................... 423/22; 75/101 BE

[56] References Cited

U.S. PATENT DOCUMENTS

| 3,437,431 | 4/1969 | Platz et al. | 423/22 |
| 3,558,288 | 1/1971 | Burrows | 75/101 BE |
| 3,787,554 | 1/1974 | Ziegler | 75/101 BE |
| 3,960,549 | 6/1976 | MacGregor | 75/101 BE |
| 3,979,207 | 9/1976 | MacGregor | 75/101 BE |
| 4,012,481 | 3/1977 | Blatz et al. | 75/101 BE |
| 4,041,126 | 8/1977 | Blatz et al. | 75/101 BE |
| 4,105,742 | 8/1978 | Edwards et al. | 75/101 BE |

OTHER PUBLICATIONS

Borbat et al., "Chemical Absts.", vol. 65, 1966, #11423(c).

Primary Examiner—Herbert T. Carter

Attorney, Agent, or Firm—Cushman, Darby & Cushman

[57] ABSTRACT

This invention relates to the separation and purification of the platinum group metals; more particularly it relates to the separation of mixtures of Pt and/or Pd from Rh and/or Ru.

In more detail, the present invention relates to a process for the separation or purification of platinum group metals in which either platinum, iridium (IV) and/or palladium (II) are present in aqueous solution together with one or more other platinum group or base metals comprising the steps of:

(a) adjusting the acidity, if necessary, to provide a pH less than 7;

(b) contacting the said aqueous solution with an organic phase containing at least one nitrogen containing organic compound selected from the group consisting of primary, secondary and tertiary amines and quarternary ammonium compounds and at least one oxygen containing organic compound selected from the group consisting of alcohols, phenols and carboxylic acids;

(c) removing from contact with the said solution the said organic phase now containing the platinum, iridium (IV) and/or palladium (II) extracted together with the nitrogen- and oxygen-containing organic compounds; and (d) contacting the organic phase obtained at stage (c) above with a strongly acidic solution and thus stripping the platinum, iridium and/or palladium from the said organic phase and obtaining an aqueous solution of the said metals.

11 Claims, 5 Drawing Figures

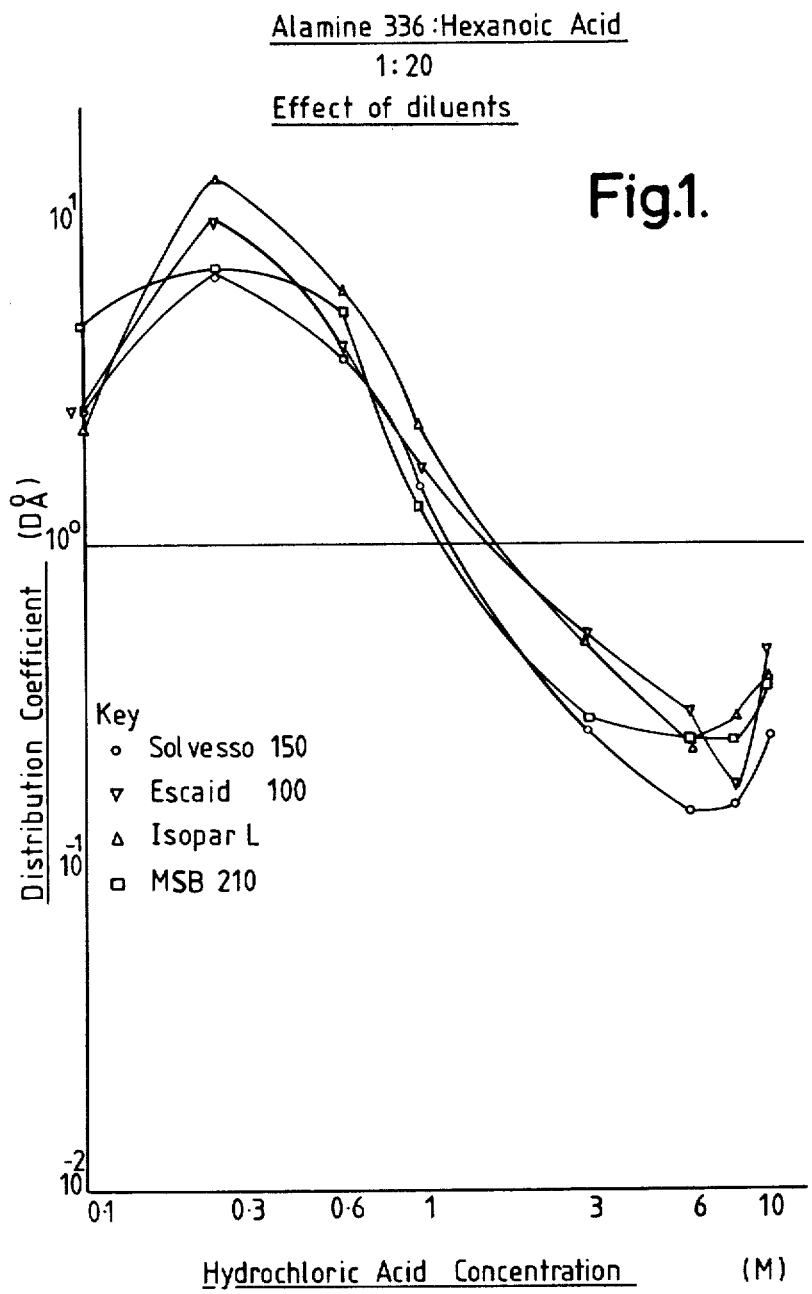

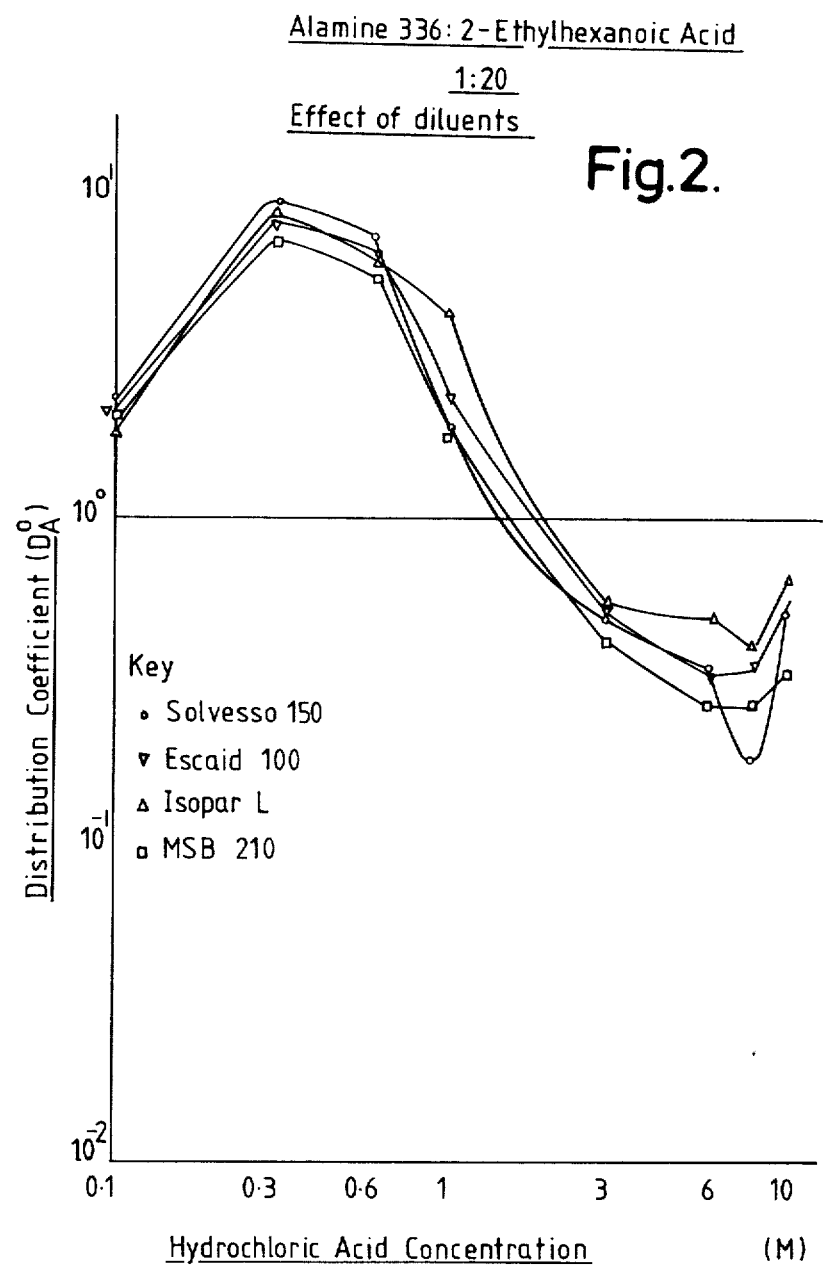

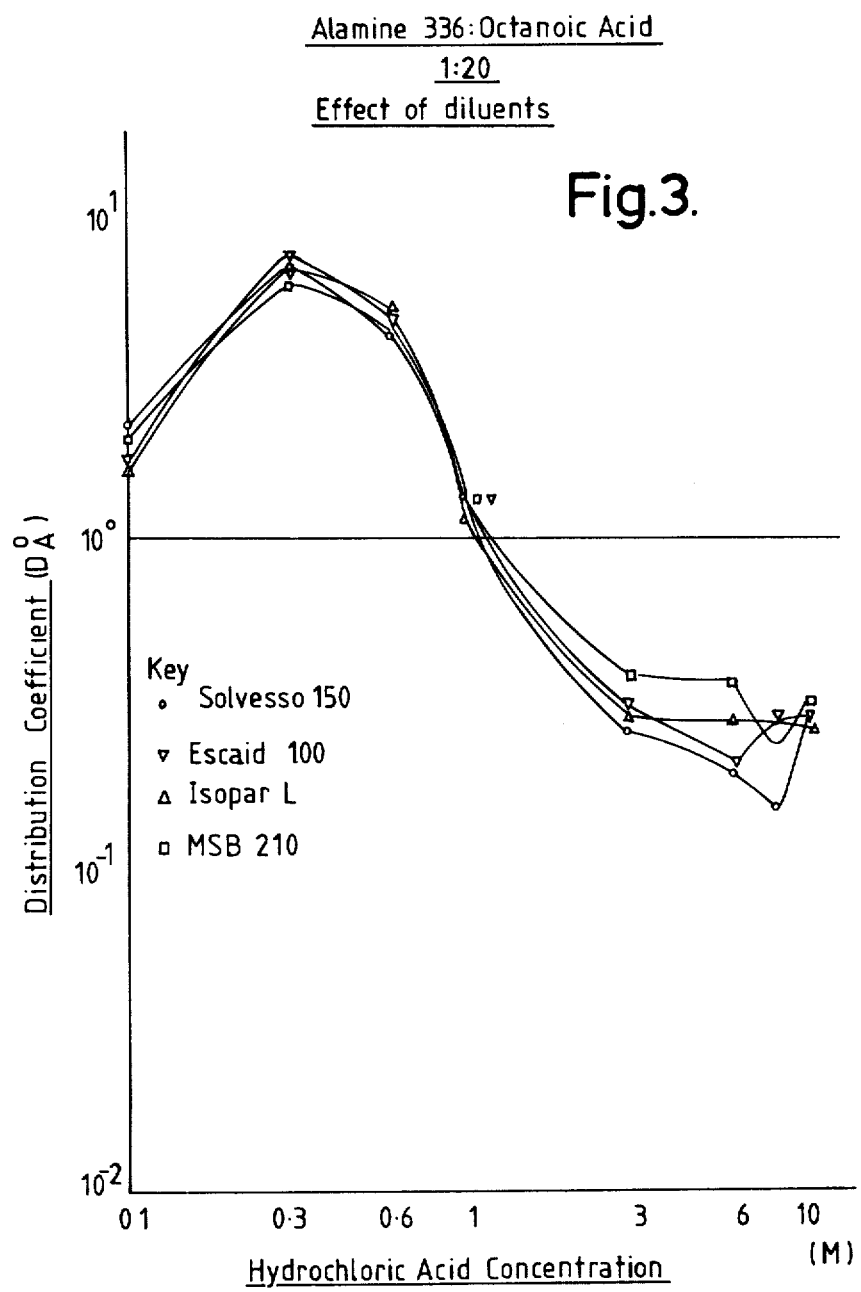

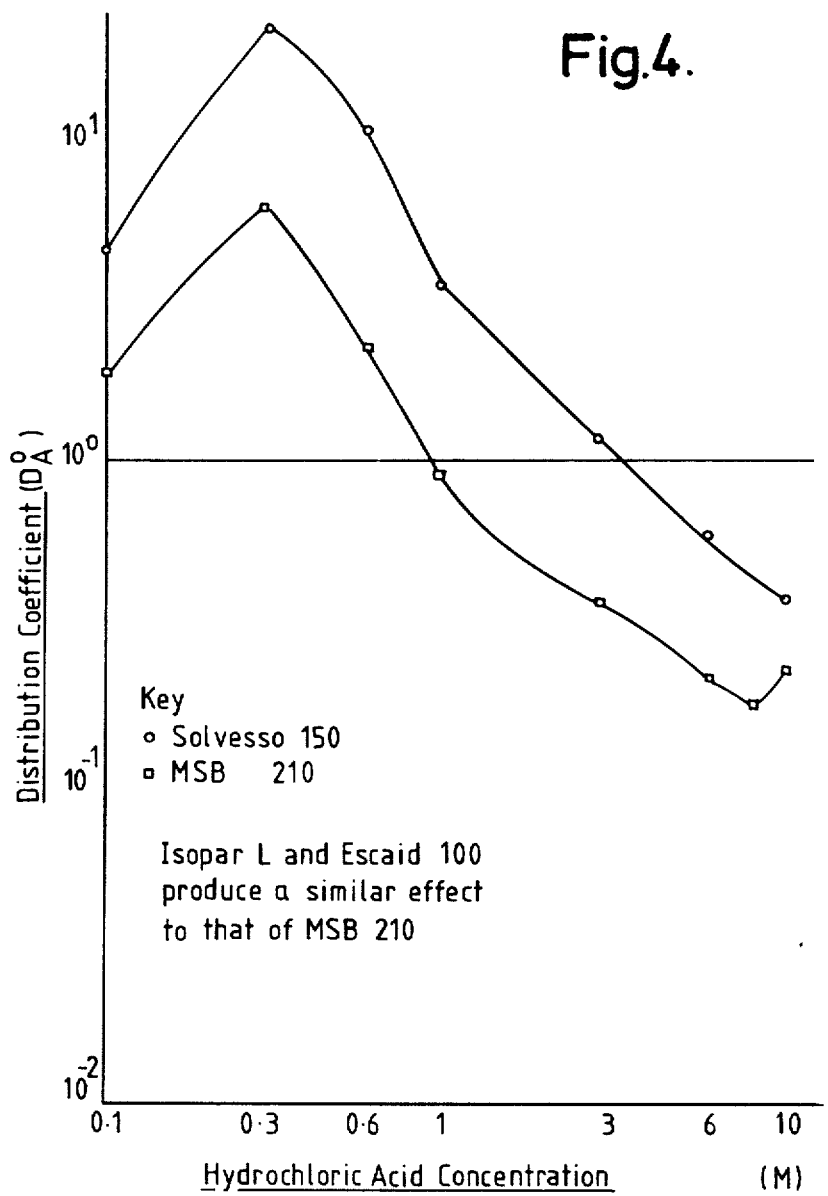

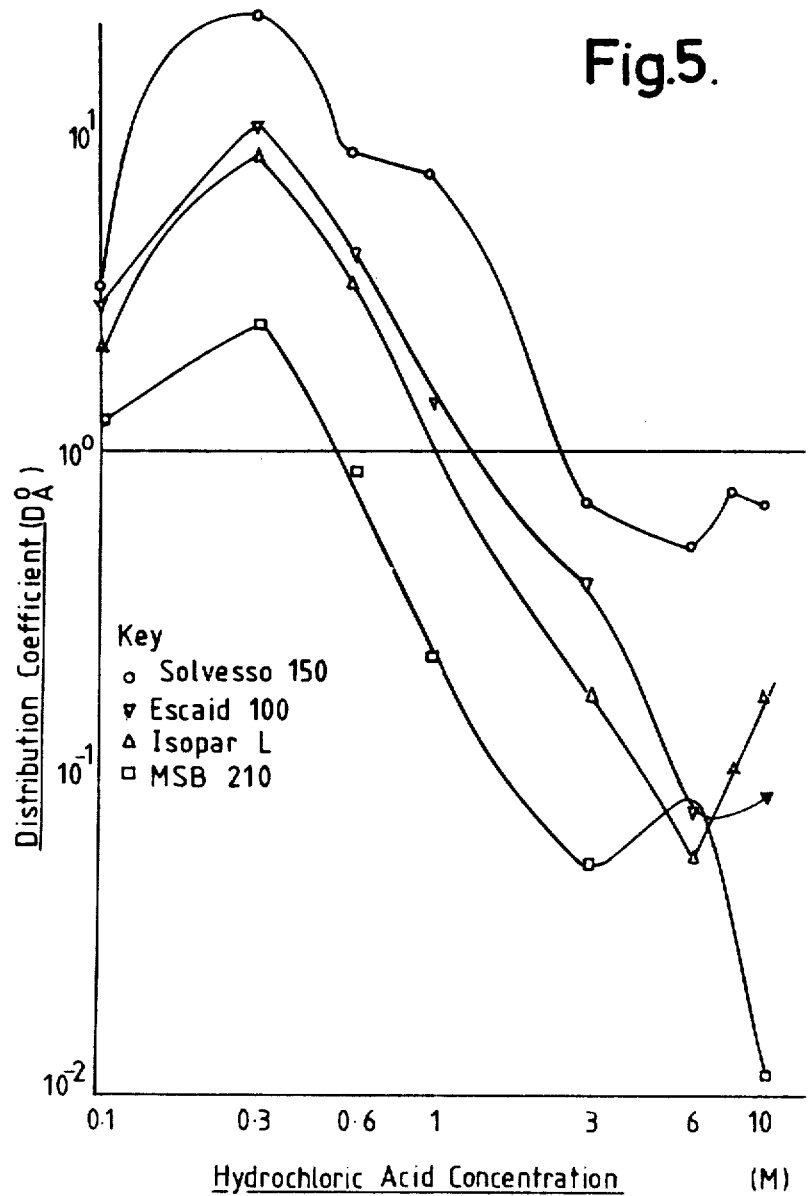

SOLVENT EXTRACTION OF PLATINUM GROUP METALS

This is a continuation of application Ser. No. 213,489 filed Dec. 5, 1980, now abandoned.

This invention relates to the separation and purification of the platinum group metals; more particularly it relates to the separation of mixtures of Pt, Ir and/or Pd from Rh and/or Ru.

In the recovery and separation of the platinum group metals from mineral deposits it is frequently necessary to separate and purify Pt, Ir and/or Pd from aqueous solutions also containing salts of Ru and Rh together with small quantities of dissolved base metals such as Fe, Cu, Ni and Se present to the extent of up to 5% by weight.

Examples of such processes involving separation and purification are described in U.S. Pat. Nos. 3,960,549 and 3,979,207. The present invention, which constitutes a modification and improvement in the inventions described in the above-mentioned specifications, is also applicable wherever it is desired to recover Pt or Ir by solvent extraction.

In the solvent extraction process described in U.S. Pat. No. 3,960,549, the solution is preferably acidified at stage (a) with hydrochloric acid to establish an HCl strength within the range 3-9 M, preferably about 6 M. In order to prevent any Ir(IV) present being extracted with the Pt, chemical reduction of the Ir to Ir(III) is then effected. The Pt is then extracted by the use of a tertiary amine extractant such as Alamine 336. The Pt is preferably stripped from the Alamine 336 by the use of an alkaline stripping solution. Alkali metal hydroxides, carbonates or bicarbonates or ammonium hydroxide were recommended for this purpose. Similar considerations apply later in the process to the Ir. When the Ir is re-oxidised to Ir(IV) it will be extracted equally effectively with a tertiary amine such as Alamine 336. The organic compounds are then preferably stripped with alkali. In the alternative process described in U.S. Pat. No. 3,979,207, Pt and Ir(IV) are extracted together by the same reagent.

In either case the platinum group metal is then recovered from the alkaline strip liquor. This is a wasteful operation. The present invention, which constitutes a substantial improvement over the prior art processes enables both extraction and stripping to be carried out in an acidic medium. We have now found that certain modifiers used in conjunction with specified nitrogen containing organic compounds enable platinum, palladium and/or iridium (IV) to be both extracted and stripped in an acidic environment.

According to one aspect of the present invention a process for the separation or purification of platinum group metals in which either platinum, iridium (IV) and/or palladium (II) are present in aqueous solution together with one or more other platinum group or base metals comprises the steps of:

(a) adjusting the acidity, if necessary, to provide a pH less than 7;

(b) contacting the said aqueous solution with an organic phase containing at least one nitrogen containing organic compound selected from the group consisting of primary, secondary and tertiary amines and quarternary ammonium compounds and at least one oxygen containing organic compound selected from the group consisting of alcohols, phenols and carboxylic acids;

(c) removing from contact with the said solution the said organic phase now containing the platinum, iridium (IV) and/or palladium (II) extracted together with the nitrogen- and oxygen-containing organic compounds; and (d) contacting the organic phase obtained at stage (c) above with a strongly acidic solution and thus stripping the platinum, iridium and/or palladium from the said organic phase and obtaining an aqueous solution of the said metals.

In stage (a), if the aqueous solution does not already have a pH less than 7, it is preferably acidified with hydrochloric acid to establish a hydrochloric acid strength within the range 0.1-1 molar, preferably about 0.3 molar. At stage (a) the chloride concentration of the solution should be relatively low, preferably within the range 0.1-1.0 molar.

In step (b), the preferred nitrogen containing organic compound used is a branched chain secondary amine of general formula $R_2NH$ in which R is aliphatic, preferably $C_{12}$-$C_{14}$ alkyl. Iso-alkyl groups may also be used in the secondary amine, however, and the R groups may therefore be the same or different and selected from the group comprising the normal and iso isomers of hexyl, heptyl, octyl, nonyl, decyl, undecyl and dodecyl alkyl groups.

Examples of commercially available secondary amines which may be used are:

(a) N-dodecyl (trialkylmethyl) amine (Amberlite LA 1)(Registered Trade Mark); a secondary amine supplied by Rohm & Haas having a molecular weight within the range 351-393);

(b) N-lauryl (trialkylmethyl) amine (lauryl=dodecyl) Amberlite LA 2 (Registered Trade Mark); a secondary amine supplied by Rohm & Haas having a molecular weight within the range 353-395);

(c) Amine 9D-178 (a secondary amine mixture);

(d) Armeens (Registered Trade Mark) and Ethomeens (Registered Trade Mark) supplied by Armour-Hess Chemicals; and (e) Adogen 283, di isotridecylamine.

Primary amines may be used in step (b) and include those of the type $RNH_2$ where R is aliphatic, preferably ranging from $C_6$-$C_{30}$. Both normal and iso alkyl groups may be used.

Examples of primary amines which may be used are:

(a) dodecylamine; and (b) Primene (Registered Trade Mark) and JM-T and 81-R, supplied by Rohm & Haas.

Tertiary amines also may be used in step (b). Suitable tertiary amines include those of the type $R_3N$ where R is aliphatic. Preferred R groups are normal alkyl ranging from $C_6$-$C_{14}$. Iso-alkyl groups may also be used and the R groups may, therefore, be the same or different and selected from normal or iso isomers of hexyl, heptyl, octyl, nonyl, decyl, undecyl and dodecyl alkyl groups.

Examples of tertiary amines which may be used are:
tri-n-hexylamine;
methyldi-n-octylamine;
tri-n-octylamine;
tri-iso-octylamine;
tri-n-heptylamine;
tri-iso-heptylamine;
tri-n-nonylamine; and
tri-iso-nonylamine.

Quarternary ammonium compounds may also be used in step (b), suitable compounds including those of the type $R_4N^+X^-$ where R is preferably aliphatic and is a normal alkyl ranging from $C_6$–$C_{14}$, although iso-alkyl groups may also be used. The R groups may, therefore, be the same or different and selected from normal or iso isomers of hexyl, heptyl, octyl, nonyl, decyl, undecyl and dodecyl alkyl groups. X in the above is preferably halide, for example chloride.

In the above formula, the compound is represented as being a salt of a mono-valent anion. Salts of poly-valent anions such as sulphate, phosphate and the like may also be used, however.

Examples of suitable quarternary ammonium salts are:
methyltrioctyl ammonium chloride;
tetrahexyl ammonium chloride;
tetraoctyl ammonium chloride; and
tetraiso-octyl ammonium chloride.

Aromatic and mixed aliphatic aromatic R group may also be used for the tertiary amine and quarternary ammonium compounds. Examples of such tertiary amines and quarternary ammonium compounds are:
triphenylamine;
tribenzylamine;
diphenyl methylamine;
phenyl trimethyl ammonium hydroxide;
dimethyl benzylamine; and
dimethyloctyl benzyl ammonium chloride.

Examples of commercially available tertiary amines and quarternary ammonium compounds which can be used are:

(a) Arquad 2HT (Registered Trade Mark); a dimethyl dioctadecyl quarternary ammonium chloride;
(b) Ethomeens (Registered Trade Mark) for tertiary amines and quaternary ammonium compounds, mostly water insoluble, supplied by Armour-Hess;
(c) Adogens (Registered Trade Mark; supplied by Ashland Chemicals): Adogen 364 Tri-n-alkylamine, predominantly $C_9$; Adogen 381 Tri-iso octylamine and Adogen 383 tri-tridecylamine;
(d) Alamines (Registered Trade Mark; tertiary amines supplied by General Mills): Alamine 336 Tricaprylamine, predominantly $C_8$–$C_{10}$ (capryl-=octyl) Alamine 308, and
(e) Aliquats (Registered Trade Mark) quarternary ammonium compounds supplied by General Mills: Aliquat 336 methyl tri-n-alkyl-ammonium chloride; a quarternary having predominantly $C_8$–$C_{10}$ normal alkyl groups.

In step (b), the nitrogen containing organic compound is preferably equilibrated with an acid, preferably hydrochloric acid, before contacting with the acidified solution.

Oxygen containing organic compounds for use in the organic phase used in step (b) are straight chain, branched chain and cyclic alcohols, straight chain, branched chain and cyclic carboxylic acids and phenols. By "alcohols" we mean to include polyols, e.g. diols, and by "carboxylic acids" we mean to include aromatic acids such as benzoic acids. A list giving examples appears in Table 1.

TABLE 1

| CHEMICAL CLASS | MODIFIER | MOLECULAR WEIGHT | NATURAL STATE |
|---|---|---|---|
| Straight chain | Hexan-1-ol | 108 | liquid |
| alcohol | Octan-1-ol | 130 | liquid |
|  | Dodecanol | 186 | solid m.p. 21° |
| Branched | 2-Ethylbutanol | 130 | liquid |
| Primary | 2-Ethylhexanol |  | liquid |
| alcohol | 3,5,5-Trimethylhexanol | 144 | liquid |
|  | Tridecanol | 200 | liquid |
| Secondary | Octan-2-ol | 130 | liquid |
| alcohol | 2,6,8-Trimethyl-4-nonanol | 198 | liquid |
|  | 4-Methylpentan-2-ol | 110 | liquid |
| Tertiary alcohol | t-Pentanol | 88 | liquid |
| Cyclic | Cyclohexanol | 100 | liquid |
| alcohols | 3,3,5-Trimethylcyclohexanol | 142 | soldid m.p. 34° |
| Straight | Hexanoic acid | 116 | liquid |
| chain | Octanoic acid | 144 | liquid |
| acid | Dodecanoic acid | 200 | solid m.p. 43° |
| Branched | 2-Ethylbutyric acid | 116 | liquid |
| chain | 2-Ethylhexanoic acid | 144 | liquid |
| acids | 3,5,5-Trimethylhexanoic acid | 158 | liquid |
|  | Versatic acid 9/11 | 172 | liquid |
| Cyclo Aliphatic | Naphthenic acid | 180 | liquid |
|  | Nonylphenol | 220 | liquid |
| Phenols | Dodecylphenol | 263 | liquid |
|  | 2,4-di-t-butylphenol | 206 | solid m.p. 52–57° |
| Di-ols | 2-Ethylhexane-1,3-diol | 146 | liquid |
| Benzoic acids | p-tertiary butyl benzoic acid | 178 | solid m.pt. 166–167° |

At step (d) the strongly acidic solution is preferably strong HCl solution but other strongly acidic solutions such as HBr and $HClO_4$ could be used.

Known techniques may be used for ensuring adequate contact of the nitrogen and oxygen containing organic compounds with aqueous solution as described in step (b) and with the strongly acidic solution as described in step (d). If the operation is being carried out on a large scale, a multi-stage counter-current extraction assembly may be used. Alternatively, the two phases may be vigorously agitated together by shaking, stirring, etc.

The invention also includes platinum group metals obtained using the process according to the invention.

The process of the present invention lends itself to operation in a multi-stage counter-current extraction assembly and, accordingly, a further feature of the present invention includes the use of a counter-current extraction assembly for the separation of rhodium, platinum, palladium, ruthenium and iridium as described above.

Feed liquors can vary greatly in their concentrations of platinum group metals.

The invention will now be described with reference to the following examples and the accompanying drawings which graphically show the effect of diluent in the process of the invention.

Example 1-PRELIMINARY INVESTIGATION OF MODIFIERS ON ADOGEN 383

Stock solutions containing 10 gl$^{-1}$ Pt (IV) in 0.1, 0.3, 0.6, 1.0, 3.0, 6.0 and 10.0 M hydrochloric acid were prepared from sodium hexachloroplatinate (IV) and standardised acid. ($H_2PtCl_6$ was used to prepare the 10 M HCl solution due to problems with precipitation of NaCl). Samples (25 ml) of these solutions were contacted with equal volumes of an organic phase as listed in Table 2 for two minutes. The aqueous phases were separated and analysed for platinum by atomic absorption spectroscopy. From the analyses, the concentrations in the organic phase were determined by difference and the distribution coefficients then calculated.

The distribution coefficients given in Table 2 indicate that all the oxygen containing compounds used as modifiers for Adogen 383 reduced its extractive power. Both octanoic and 2-ethyl hexanoic acids, at the 50% (w/v) level (3.5 M) modify the extractive power of Adogen 383 sufficiently to allow acid stripping ($D_A°$ 0.23 and 0.25) (a distribution coefficient of <1, preferably <0.5, being required for efficient stripping) whilst giving sufficiently high distribution coefficients from 0.3–0.6 M HCl (6.9–12 and 8.1–15) for complete extraction to be achieved. Versatic (Registered Trade Mark) 911 acid has a smaller effect which could be due to the fact that it is present at a lower molar concentration (2.9 M). Nonylphenol has a considerably stronger effect than any of the other modifiers and it required only 15% (w/v) (0.7 M) to give a comparable effect to 50% (w/v) (3.5 M) octanoic and 2-ethyl hexanoic acids.

TABLE 2

|  | 0.1 M | 0.3 M | 0.6 M | 1.0 M | 3.0 M | 6.0 M | 10.0 M |
|---|---|---|---|---|---|---|---|
| 0.25M ADOGEN 383 IN SOLVESSO 150 | >2 × 10$^3$ | >2 × 10$^3$ | >2 × 10$^3$ | >2 × 10$^3$ | 1 × 10$^3$ | 4.8 × 10$^2$ | 9.8 × 10$^0$ |
| 0.25M ADOGEN 383 + 50% 2-ETHYL HEXANOIC ACID IN SOLVESSO 150 | 8.8 × 10$^0$ | 1.5 × 10$^1$ | 8.1 × 10$^0$ | 3.8 × 10$^0$ | 7.3 × 10$^{-1}$ | 2.5 × 10$^{-1}$ | 2.5 × 10$^{-1}$ |
| 0.25M ADOGEN 383 IN 2-ETHYLHEXANOIC ACID | | 3.9 × 10$^0$ | 2.9 × 10$^0$ | 1.4 × 10$^0$ | | | 1.05 × 10$^{-1}$ |
| 0.25M ADOGEN 383 + 50% OCTANOIC ACID IN SOLVESSO 150 | 9.0 × 10$^0$ | 1.2 × 10$^1$ | 6.9 × 10$^0$ | 2.9 × 10$^0$ | 6.2 × 10$^{-1}$ | 2.2 × 10$^{-1}$ | 2.3 × 10$^{-1}$ |
| 0.25M ADOGEN 383 + 50% VERSATIC 911 ACID IN SOLVESSO 150 | 5.5 × 10$^1$ | 5.8 × 10$^1$ | 1.9 × 10$^1$ | 9.9 × 10$^0$ | 2.7 × 10$^0$ | 1.1 × 10$^0$ | 5.2 × 10$^{-1}$ |
| 0.25M ADOGEN 383 + 50% 2-ETHYL-HEXANOL IN SOLVESSO 150 | 1.6 × 10$^2$ | 1.3 × 10$^2$ | 2.1 × 10$^1$ | 8.4 × 10$^0$ | 1.6 × 10$^0$ | 2.0 × 10$^0$ | 2.1 × 10$^0$ |
| 0.25M ADOGEN 383 + 10% NONYLPHENOL IN SOLVESSO 150 | 4.4 × 10$^1$ | 4.3 × 10$^1$ | 1.6 × 10$^1$ | 7.9 × 10$^0$ | 1.7 × 10$^0$ | 5.4 × 10$^0$ | 5.5 × 10$^0$ |
| 0.25M ADOGEN 383 + 15% NONYLPHENOL IN SOLVESSO 150 | 1.9 × 10$^1$ | 2.1 × 10$^1$ | 5.3 × 10$^0$ | 2.0 × 10$^0$ | 3.2 × 10$^{-1}$ | 1.4 × 10$^{-1}$ | 1.15 × 10$^{-1}$ |
| 0.25M ADOGEN 383 + 25% NONYLPHENOL IN SOLVESSO 150 | 6.1 × 10$^0$ | 6.3 × 10$^0$ | 1.2 × 10$^0$ | 3.1 × 10$^{-1}$ | 4.6 × 10$^{-2}$ | 1.6 × 10$^{-2}$ | 1.3 × 10$^{-2}$ |

ALL % ARE w/v %

Example 2-EFFECT OF MODIFIERS ON ALAMINE 336

The hydrogen bonding modifiers investigated in this example are selected from those listed in Table 1, viz, alcohols, carboxylic acids and phenols with a wide range of carbon-chain structures and molecular weights. In order to determine the maximum possible effect of each modifier the first experiments were carried out on solutions where the modifier was used as the only diluent present. The mole ratio of amine to modifier was calculated from the weight of each used. In cases where the modifier was a solid at room temperature a saturated solution in Solvesso 150 was used as diluent.

Experimental

Distribution data was obtained for platinum (IV) as described in Example 1 above, using 0.25 M solutions (9.8% w/v) of Alamine 336 in the appropriate modifier or modifier/Solvesso combination. The results are recorded in Table 3.

TABLE 3

DISTRIBUTION COEFFICIENTS FOR Pt (IV) USING ALAMINE 336 IN THE PRESENCE OF MODIFIERS

| MODIFIER | AMINE: MODIFIER Molar Ratio | Diluent if Required | MOLARITY OF HCl SOLUTION | | | | | | | |
|---|---|---|---|---|---|---|---|---|---|---|
|  |  |  | 0.1 M | 0.3 M | 0.6 M | 1 M | 3 M | 6 M | 8 M | 10 M |
| None | — | Solvesso 150 | >2×10$^3$ | >2×10$^3$ | >2×10$^3$ | >2×10$^3$ | >2×10$^3$ | 6.9×10$^2$ | 9.9×10$^1$ | 1.3×10$^1$ |
| Hexan-1-ol | 1:27.4 | — | 4.8×10$^0$ | 1.6×10$^2$ | 2.9×10$^1$ | 1×10$^1$ | 4.7×10$^1$ | 5.3×10$^0$ | 4.5×10$^0$ | 3.5×10$^0$ |
| Octan-1-ol | 1:22 | — | 4.9×10$^0$ | 7.5×10$^1$ | 2.6×10$^1$ | 5.8×10$^0$ | 3.2×10$^0$ | 3.1×10$^0$ | 2.8×10$^0$ | 3.5×10$^0$ |
| Dodecanol | 1:10 | Solvesso 150 | 1.1×10$^1$ | 4.7×10$^2$ | 7.7×10$^1$ | 1.9×10$^1$ | 2.8×10$^0$ | * | * | 2.6×10$^0$ |
| 2-Ethylbutanol | 1:22 | — | 5.4×10$^0$ | 2.4×10$^0$ | 1.6×10$^1$ | 5.4×10$^0$ | 2.1×10$^0$ | 3×10$^0$ | 2.4×10$^0$ | 2×10$^0$ |
| 2-Ethylhexanol | 1:22 | — | 1.9×10$^2$ | 1.4×10$^2$ | 1.8×10$^1$ | 4.8×10$^0$ | 1.9×10$^0$ | 2.5×10$^0$ | 3×10$^0$ | 2.6×10$^0$ |
| 3,5,5-Trimethyl-hexanol | 1:20 | — | >2×10$^3$ | >2×10$^3$ | 2.4×10$^1$ | 1.8×10$^1$ | 1.6×10$^0$ | 2.8×10$^0$ | 3.2×10$^0$ | 2.8×10$^0$ |
| Tridecanol | 1:14.9 | — | 8.8×10$^0$ | 9.8×10$^1$ | 2.6×10$^1$ | 7.5×10$^0$ | 2.5×10$^0$ | 3.2×10$^0$ | 3.2×10$^0$ | 6.7×10$^0$ |
| Octan-2-ol | 1:22 | — | 6.7×10$^0$ | 1.3×10$^2$ | 1.1×10$^1$ | 1.1×10$^1$ | 2.6×10$^0$ | 2.5×10$^0$ | 2.1×10$^0$ | 1.4×10$^0$ |
| 4-Methylpentan-2-ol | 1:25 | — | 6.3×10$^0$ | 5.0×10$^2$ | 2.9×10$^1$ | 8.1×10$^0$ | 2.9×10$^0$ | 2.5×10$^0$ | 1.9×10$^0$ | 1.2×10$^0$ |
| t-Pentanol | 1:32 | — | 5.3×10$^0$ | 1.7×10$^2$ | 5.5×10$^1$ | 1.5×10$^0$ | 7.1×10$^0$ | 5.3×10$^0$ | 2.8×10$^0$ | 2.9×10$^0$ |
| Cyclohexanol | 1:33 | — | 5.5×10$^0$ | 7.3×10$^1$ | 1.9×10$^1$ | 7.8×10$^0$ | 6.2×10$^0$ | 4.1×10$^2$ | + | + |

TABLE 3-continued
DISTRIBUTION COEFFICIENTS FOR Pt (IV) USING ALAMINE 336 IN THE PRESENCE OF MODIFIERS

| MODIFIER | AMINE: MODIFIER Molar Ratio | Diluent if Required | MOLARITY OF HCl SOLUTION | | | | | | | |
|---|---|---|---|---|---|---|---|---|---|---|
| | | | 0.1 M | 0.3 M | 0.6 M | 1 M | 3 M | 6 M | 8 M | 10 M |
| 3,3,5-Trimethyl-cyclohexanol | 1:21 | — | $>2 \times 10^3$ | $>2 \times 10^3$ | $7.6 \times 10^1$ | $2.8 \times 10^1$ | $1.2 \times 10^1$ | $6.9 \times 10^0$ | $4.7 \times 10^0$ | $2.5 \times 10^0$ |
| Hexanoic acid | 1:28 | — | $1.6 \times 10^0$ | $2.7 \times 10^0$ | $1.4 \times 10^0$ | $4.7 \times 10^{-1}$ | $6 \times 10^{-2}$ | $1.5 \times 10^{-1}$ | $2.5 \times 10^{-1}$ | $4.5 \times 10^{-1}$ |
| Hexanoic acid | 1:20 | Solvesso 150 | $2.5 \times 10^0$ | $6.6 \times 10^0$ | $3.7 \times 10^0$ | $1.5 \times 10^0$ | $2.6 \times 10^{-1}$ | $1.5 \times 10^{-1}$ | $1.6 \times 10^{-1}$ | $2.6 \times 10^{-1}$ |
| Octanoic acid | 1:22 | — | $1.5 \times 10^0$ | $4.6 \times 10^0$ | $2.7 \times 10^0$ | $8.9 \times 10^{-1}$ | $1.9 \times 10^{-1}$ | $1.2 \times 10^{-1}$ | $1 \times 10^{-1}$ | $2.5 \times 10^{-1}$ |
| Octanoic acid | 1:15 | Solvesso 150 | $5.1 \times 10^0$ | $2.6 \times 10^0$ | $4.2 \times 10^0$ | $3.3 \times 10^0$ | $1.2 \times 10^0$ | $8.2 \times 10^{-1}$ | $1 \times 10^0$ | $1.1 \times 10^0$ |
| Dodecanoic acid | 1:8.5 | Solvesso 150 | $>2 \times 10^3$ | $>2 \times 10^3$ | $1.8 \times 10^1$ | $1.3 \times 10^1$ | $2.6 \times 10^0$ | $1.5 \times 10^0$ | $1.5 \times 10^0$ | $1.4 \times 10^0$ |
| 2-Ethylhexanoic acid | 1:22 | — | $1.1 \times 10^1$ | $7.2 \times 10^0$ | $4.7 \times 10^0$ | $2 \times 10^0$ | $6.1 \times 10^{-1}$ | $3.1 \times 10^{-1}$ | $5 \times 10^{-1}$ | $7 \times 10^{-1}$ |
| 2-Ethylhexanoic acid | 1:15 | Solvesso 150 | $>2 \times 10^3$ | $>2 \times 10^3$ | $>2 \times 10^3$ | $7.9 \times 10^1$ | $1.8 \times 10^0$ | $9.8 \times 10^1$ | $1.8 \times 10^1$ | $7.9 \times 10^1$ |
| 3,3,5 Trimethyl-hexanoic acid | 1:20 | — | $1.7 \times 10^0$ | $7.5 \times 10^0$ | $5.2 \times 10^0$ | $1.7 \times 10^0$ | $3.5 \times 10^{-1}$ | $2.2 \times 10^{-1}$ | $2.7 \times 10^{-1}$ | $8.9 \times 10^{-1}$ |
| 3,3,5 Trimethyl-hexanoic acid | 1:15 | Solvesso 150 | $2.9 \times 10^0$ | $1.5 \times 10^1$ | $9.3 \times 10^0$ | $3.2 \times 10^0$ | $9.8 \times 10^{-1}$ | $7.0 \times 10^{-1}$ | $8.9 \times 10^{-1}$ | $5.6 \times 10^{-1}$ |
| Versatic acid | 1:19 | — | $>2 \times 10^3$ | $>2 \times 10^3$ | $1.3 \times 10^0$ | $7 \times 10^0$ | $1.3 \times 10^0$ | $1 \times 10^0$ | $1.6 \times 10^0$ | $8.9 \times 10^{-1}$ |
| Napthenic acid | 1:18 | — | $6.3 \times 10^0$ | $1.6 \times 10^1$ | $8.8 \times 10^0$ | $5 \times 10^0$ | $9.6 \times 10^{-1}$ | $5.2 \times 10^{-1}$ | $6.6 \times 10^{-1}$ | $1.3 \times 10^0$ |
| NonylPhenol | 1:14.8 | — | $4.9 \times 10^{-1}$ | $1.0 \times 10^0$ | $4.1 \times 10^{-2}$ | $2 \times 10^{-2}$ | $1.5 \times 10^{-1}$ | $1.2 \times 10^{-1}$ | $1.0 \times 10^{-1}$ | |
| NonylPhenol | 1:10 | Solvesso 150 | $1.3 \times 10^0$ | $3.0 \times 10^0$ | $4.9 \times 10^{-1}$ | $1.9 \times 10^{-1}$ | $1.9 \times 10^{-1}$ | $5.2 \times 10^{-2}$ | $1.9 \times 10^{-1}$ | $3.6 \times 10^{-1}$ |
| NonylPhenol | 1:5 | Solvesso 150 | $2.3 \times 10^0$ | $1.9 \times 10^0$ | $1.9 \times 10^0$ | $1.5 \times 10^0$ | $3.3 \times 10^{-1}$ | $1.2 \times 10^{-1}$ | $5.8 \times 10^{-2}$ | $1.0 \times 10^{-1}$ |
| NonylPhenol | 2:5 | Solvesso 150 | $3.5 \times 10^0$ | $2.5 \times 10^1$ | $9 \times 10^0$ | $8.1 \times 10^0$ | $7.4 \times 10^0$ | $5.4 \times 10^{-1}$ | $7.8 \times 10^{-1}$ | $7.3 \times 10^{-1}$ |
| 2,4 Di-t-butyl-Phenol | 1:10 | Solvesso 150 | $5.2 \times 10^{-1}$ | $3.2 \times 10^{-1}$ | $1.1 \times 10^{-1}$ | $4.3 \times 10^{-2}$ | $1.1 \times 10^{-2}$ | $4.5 \times 10^{-2}$ | $5.0 \times 10^{-2}$ | $3.7 \times 10^{-2}$ |
| 2,4 Di-t-butyl-Phenol | 1:5 | Solvesso 150 | $1.1 \times 10^0$ | $2.4 \times 10^0$ | $8.9 \times 10^{-1}$ | $2.0 \times 10^{-1}$ | $2.2 \times 10^{-2}$ | $4.5 \times 10^{-2}$ | $5.0 \times 10^{-2}$ | $1.4 \times 10^{-3}$ |
| 2,4 Di-t-butyl-Phenol | 1:2 | Solvesso 150 | $3.5 \times 10^0$ | $2.3 \times 10^1$ | $1.1 \times 10^1$ | $3.6 \times 10^0$ | $1.2 \times 10^0$ | $6.4 \times 10^{-1}$ | $5.1 \times 10^{-1}$ | $4.3 \times 10^{-1}$ |

Key
*Emulsion formed
+ Phases did not separate i.e. no aqueous sample recovered

The results indicate that all the acids investigated act as effective modifiers in the Alamine 336 system. Those exhibiting the most pronounced effect were:

| Ratio | | $D_A^o$ (0.3M HCl) | $D_A^o$ (6M HCl) |
|---|---|---|---|
| 1:22 | Octanoic acid | $4.6 \times 10^0$ | $1.2 \times 10^{-1}$ |
| 1:20 | Hexanoic acid | $6.6 \times 10^0$ | $1.5 \times 10^{-1}$ |
| 1:22 | 2-Ethylhexanoic acid | $7.2 \times 10^0$ | $3.1 \times 10^{-1}$ |
| 1:20 | 3,5,5 Trimethyl hexanoic acid | $7.5 \times 10^0$ | $2.2 \times 10^{-1}$ |

The changes in distribution coefficient in the case of these four modifiers quoted above enable acid stripping to be carried out when Alamine 336 is used as the extractant. The alcohols tested have a similar effect on the system but to a much lesser degree. The two phenols included in the investigation showed promise in that they depress the distribution coefficient at a much lower extractant/modifier ratio, i.e., 1:2, than is required for acids (1:20). See table 4 below.

TABLE 4

| Ratio | $D_A^o$ (0.3M HCl) | $D_A^o$ (6M HCl) |
|---|---|---|
| 2:5 Nonylphenol | $2.5 \times 10^1$ | $5.4 \times 10^{-1}$ |
| 1:2 2,4-Di-t-butylphenol | $2.3 \times 10^1$ | $6.4 \times 10^{-1}$ |
| 1:5 Nonyl Phenol | $1.9 \times 10^0$ | $1.26 \times 10^{-1}$ |
| 1:5 2,4-Di-t-butylphenol | $2.4 \times 10^0$ | $4.5 \times 10^{-2}$ |

At a 1:2 ratio for either phenol, extraction was good but acid stripping less satisfactory. However, when the phenol ratio was increased to 1:5, a more effective acid strip was achieved but extraction was impaired. The optimum ratio lies within these limits, for example 1:3 to 1:4.

The diluent used was Solvesso 150 with a composition of 99.7% aromatic and 0.3% paraffinic. Alternative diluents are Escaid 100 (20% Aromatic, 56.6. paraffinic and 23.6% Naphthenic), MSB 210 (2.5% Aromatic 97.5% paraffinic) and Isopar L(100% paraffinic).

Example 3
EFFECT OF DILUENT ON THE MODIFIED ALAMINE 336 SYSTEM

The work on the Alamine 336 was extended to investigate the effect of different diluents on the distribution co-efficient of the amine: modifier system. The systems which showed most promise when Solvesso 150 was used as diluent, were repeated using Isopar L, Escaid and MSB 210 as diluents.

The modifiers selected were

| 1. Hexanoic acid | Mole Ratio 1:20 |
|---|---|
| 2. 2 Ethyl hexanoic acid | Mole Ratio 1:20 |
| 3. Octanoic acid | Mole Ratio 1:20 |
| 4. 2,4 Di-t-Butylphenol | Mole Ratio 1:2 |
| 5. Nonylphenol | Mole Ratio 2:5 |

In the case of the acids, the amount of diluent added was relatively small (10–15%) and only a small effect was found.

However, in the case of the phenols, (where the diluent constitutes more than 50% of extradent) the change did have a more marked effect, especially for Nonylphenol. The results are illustrated graphically in FIGS. 1–5 of the accompanying drawings.

Example 4-FURTHER INVESTIGATION OF MODIFIERS ON THE ADOGEN 383 SYSTEM

A similar investigation to that carried out using Alamine 336 was also carried out using Adogen 383. The conditions in each case were identical to those of Example 1, but only a cross-section of the alcohols was investigated.

The results are given in Table 5.

TABLE 5

Distribution Coefficients of Pt (IV) Using Adogen 383 in the Presence of Modifiers

| MODIFIER | AMINE: MODIFIER MOLAR RATIO | DILUENT IF REQUIRED | ACID MOLARITY OF SOLUTION | | | | | | | |
|---|---|---|---|---|---|---|---|---|---|---|
| | | | 0.1M | 0.3M | 0.6M | 1M | 3M | 6M | 8M | 10M |
| None | | Solvesso 150 | $>2\times10^3$ | $>2\times10^3$ | $>2\times10^3$ | $>2\times10^3$ | $1\times10^3$ | $4.8\times10^2$ | $9.9\times10^1$ | $9.8\times10^0$ |
| Hexan-1-ol | 1:21 | — | $3.2\times10^0$ | $4.4\times10$ | $1.2\times10^1$ | $5\times10^0$ | $3\times10^0$ | $4.7\times10^0$ | $3.6\times10^0$ | $3\times10^0$ |
| 2-Ethylhexanol | 1:21 | — | $8.2\times10^1$ | $7\times10^1$ | $1.2\times10^1$ | $4.6\times10^0$ | $1.5\times10^0$ | $2\times10^0$ | $2.3\times10^0$ | $2.3\times10^0$ |
| 3,5,5-Trimethylhexanol | 1:14 | — | $4.1\times10^0$ | $1\times10^2$ | $1.9\times10^1$ | $7.8\times10^0$ | $2\times10^0$ | $4.1\times10^0$ | $3.6\times10^0$ | $2.8\times10^0$ |
| Cyclohexanol | 1:31 | — | $3.8\times10^0$ | $6.3\times10^1$ | $2\times10^1$ | $9\times10^0$ | $5.2\times10^0$ | $4.9\times10^0$ | $2.6\times10^0$ | — |
| 2-Ethylhexan-1,3 diol | 1:21 | — | $2.9\times10^0$ | $1.8\times10^1$ | $6.8\times10^0$ | $2.8\times10^0$ | $2.2\times10^0$ | $5.8\times10^0$ | — | — |
| 3,5,5-trimethylcyclohexanol | 1:20 | — | $3.9\times10^0$ | $1.3\times10^2$ | $2.1\times10^1$ | $1.6\times10^1$ | $3.2\times10^0$ | $3.8\times10^0$ | $3.4\times10^0$ | $2.1\times10^0$ |
| Octanoic acid | 1:20 | — | $1\times10^0$ | $3.4\times10^0$ | $1.9\times10^0$ | $6.6\times10^{-1}$ | $9.8\times10^{-2}$ | $3.0\times10^{-2}$ | $7.5\times10^{-2}$ | $7.5\times10^{-2}$ |
| Octanoic acid | 1:15 | Solvesso 150 | $1.6\times10^0$ | $9.0\times10^0$ | $4.3\times10^0$ | $1.5\times10^0$ | $3.1\times10^{-1}$ | $2.9\times10^{-1}$ | $2\times10^{-1}$ | $1.6\times10^{-1}$ |
| 2-Ethylhexanoic acid | 1:20 | — | $1\times10^0$ | $9.3\times10^0$ | $2.2\times10^0$ | $1.2\times10^0$ | $4\times10^{-1}$ | $1.9\times10^{-1}$ | $3.1\times10^{-1}$ | $1.2\times10^{-1}$ |
| 2-Ethylhexanoic acid | 1:15 | Solvesso 150 | $1.4\times10^0$ | $9.5\times10^0$ | $5.7\times10^0$ | $2.4\times10^0$ | $6.6\times10^{-1}$ | $3.3\times10^{-1}$ | $3.3\times10^{-1}$ | $2.9\times10^{-1}$ |
| Hexanoic acid | 1:26 | — | $1\times10^0$ | $3\times10^0$ | $1.3\times10^0$ | $6\times10^{-1}$ | $1.1\times10^{-1}$ | $2.5\times10^{-1}$ | $2.5\times10^{-1}$ | $1.4\times10^0$ |
| Hexanoic acid | 1:20 | Solvesso 150 | $1\times10^0$ | $4.4\times10^0$ | $2.2\times10^0$ | $9.2\times10^{-1}$ | $2.0\times10^{-1}$ | $1.2\times10^{-1}$ | $2.1\times10^{-1}$ | $1.5\times10^{-1}$ |
| Naphthenic acid | 1:17 | — | $1.3\times10^0$ | $2.3\times10^0$ | $3\times10^0$ | $1.6\times10^0$ | $5.7\times10^{-1}$ | $3.7\times10^{-1}$ | $3.9\times10^{-1}$ | $4.1\times10^{-1}$ |
| 3,5,5-Trimethylhexanoic acid | 1:18 | — | $1.1\times10^0$ | $3.2\times10^0$ | $1.3\times10^0$ | $8.2\times10^{-1}$ | $2.8\times10^{-1}$ | $1.2\times10^{-1}$ | $1.2\times10^0$ | $1.4\times10^{-1}$ |
| Dodecanoic acid | 1:5 | Solvesso 150 | $4\times10^0$ | $7.4\times10^1$ | $3.5\times10^1$ | $1.5\times10^1$ | $2.6\times10^0$ | $1.2\times10^0$ | $1.2\times10^0$ | $7.7\times10^{-1}$ |
| Versatic acid | 1:17 | — | $2.5\times10^0$ | $2.2\times10^1$ | $1.0\times10^1$ | $2.3\times10^0$ | $6.1\times10^{-1}$ | $4.3\times10^{-1}$ | $3.9\times10^{-1}$ | $5.4\times10^{-1}$ |
| 2-Ethylbutyric acid | 1:26 | — | $7.3\times10^{-1}$ | $2.4\times10^0$ | $1.4\times10^0$ | $5.26\times10^{-1}$ | $5.2\times10^{-2}$ | $3\times10^{-2}$ | $8.6\times10^{-2}$ | $1.6\times10^{-1}$ |
| 2,4-di-t-butyl-phenol | 1:5 | Solvesso 150 | $9.2\times10^{-1}$ | $1.8\times10^0$ | $3.3\times10^{-1}$ | $2.2\times10^{-1}$ | $7.5\times10^{-2}$ | $2\times10^{-2}$ | $3.1\times10^{-2}$ | $5.2\times10^{-1}$ |
| Nonylphenol | 1:5 | Solvesso 150 | $6.1\times10^0$ | $6.3\times10^0$ | $1.2\times10^0$ | $3.1\times10^{-1}$ | $4.6\times10^{-2}$ | $1.6\times10^{-2}$ | — | $1.3\times10^{-2}$ |
| Nonylphenol | 1:3 | Solvesso 150 | $1.9\times10^1$ | $2.1\times10^1$ | $5.3\times10^0$ | $2.0\times10^0$ | $3.2\times10^{-1}$ | $1.4\times10^{-1}$ | — | $1.3\times10^{-1}$ |
| Nonylphenol | 1:2 | Solvesso 150 | $3\times10^0$ | $4.8\times10^1$ | $1.6\times10^1$ | $4.9\times10^0$ | $1.4\times10^0$ | $8.2\times10^{-1}$ | $7.4\times10^{-1}$ | $4.3\times10^{-1}$ |

Example 5—EFFECT OF MODIFIERS ON THE AMBERLITE LA2 SYSTEM

A similar investigation to that of Example 4 was carried out using Amberlite LA2, a secondary amine. The conditions in each case were identical with those of Example 1, representative modifiers only being evaluated.

The results are given in Table 6.

Example 6—EFFECT OF MODIFIERS ON THE EXTRACTION OF IRIDIUM (IV)

Stock solutions containing 10 gl$^{-1}$ Ir (IV) in 0.1, 0.5, 1, 5 and 10 M hydrochloric acid were prepared from sodium hexachloroiridate (IV) and standardised acid. Aliquots of these solutions were contacted with equal volumes of the organic phases listed in Table 7 for two minutes. The aqueous phases were separated and

TABLE 6

DISTRIBUTION COEFFICIENTS FOR THE EXTRACTION OF Pt (IV) USING 0.25M AMBERLITE LA2 IN SOLVESSO 150 IN THE PRESENCE OF MODIFIERS

| MODIFIER | AMINE MODIFIER MOLAR RATIO | ACID MOLARITY OF SOLUTION | | | | | | | |
|---|---|---|---|---|---|---|---|---|---|
| | | 0.1 | 0.3 | 0.6 | 1 | 3 | 6 | 8 | 10 |
| None | — | $5.2\times10^1$ | $9.9\times10^1$ | $3.6\times10^1$ | $1.6\times10^1$ | $3.9\times10^0$ | $1.7\times10^0$ | $1.0\times10^0$ | $4.2\times10^{-1}$ |
| Octanoic Acid | 1:1 | $1.3\times10^1$ | $4.6\times10^1$ | $6.7\times10^0$ | $4.9\times10^0$ | $1.1\times10^0$ | $6\times10^{-1}$ | $4.5\times10^{-1}$ | $2.5\times10^{-1}$ |
| Octanoic Acid | 1:2 | $4.7\times10^0$ | $4\times10^1$ | $1\times10^1$ | $4.5\times10^0$ | $8\times10^{-1}$ | $3.8\times10^{-1}$ | $3.3\times10^{-1}$ | $1.9\times10^{-1}$ |
| Octanoic Acid | 1:3 | $3.5\times10^0$ | $2.6\times10^1$ | $7.8\times10^0$ | $2.8\times10^0$ | $6\times10^{-1}$ | $3.1\times10^{-1}$ | $2.5\times10^{-1}$ | $2.3\times10^{-1}$ |
| Octanoic Acid | 1:4 | $2.8\times10^0$ | $2.2\times10^1$ | $7.0\times10^0$ | $4\times10^0$ | $3\times10^0$ | $2\times10^{-1}$ | $1.7\times10^{-1}$ | $8.1\times10^{-1}$ |
| Dodecyl Phenol | 2:1 | $5.3\times10^0$ | $3.7\times10^1$ | $1.2\times10^1$ | $4\times10^0$ | $1\times10^0$ | $5.5\times10^{-1}$ | $3.8\times10^{-1}$ | $2.3\times10^{-1}$ |
| Nonyl Phenol | 2:1 | $2.9\times10^0$ | $4.4\times10^1$ | $1.3\times10^1$ | $5.5\times10^0$ | $1\times10^0$ | $6.2\times10^{-1}$ | $4.4\times10^{-1}$ | $2\times10^{-1}$ |
| 2,4Di-t-Butyl-phenol | 2:1 | $2.9\times10^0$ | $4.6\times10^1$ | $1.4\times10^1$ | $4.9\times10^0$ | $1\times10^0$ | $6.7\times10^{-1}$ | $5.6\times10^{-1}$ | $3.1\times10^{-1}$ |
| Nonylphenol | 4:3 | $2.3\times10^0$ | $3.1\times10^1$ | $7.5\times10^0$ | $2.7\times10^0$ | $6.5\times10^{-1}$ | $6.5\times10^{-1}$ | $3.1\times10^{-1}$ | $2.1\times10^{-1}$ |
| Nonylphenol | 1:1 | $1.8\times10^0$ | $1.56\times10^0$ | $4.7\times10^0$ | $1.4\times10^0$ | $3.8\times10^{-1}$ | $2.5\times10^{-1}$ | $2.5\times10^{-1}$ | $3\times10^{-1}$ |
| 2,4Di-t-Butyl-phenol | 1:1 | $1.56\times10^1$ | $4.5\times10^0$ | $3.5\times10^0$ | $1.4\times10^0$ | $3.6\times10^{-1}$ | $1.6\times10^{-1}$ | $1.36\times10^{-1}$ | $1.4\times10^{-1}$ |
| Hexanoic Acid | 1:4 | $2.8\times10^0$ | $1.95\times10^1$ | $4.7\times10^0$ | $1.8\times10^0$ | $3.6\times10^{-1}$ | $2.2\times10^{-1}$ | $2.2\times10^{-1}$ | $2.1\times10^{-1}$ |
| 3,5,5. Trimethyl Hexanoic Acid | 1:4 | $3.4\times10^0$ | $1.8\times10^1$ | $5.2\times10^0$ | $2\times10^0$ | $3.5\times10^{-1}$ | $1.8\times10^{-1}$ | $1.6\times10^{-1}$ | $1.5\times10^{-1}$ |
| 2 Ethylhexanoic Acid | 1:4 | $2.6\times10^0$ | $1.9\times10^1$ | $5.9\times10^0$ | $2.2\times10^0$ | $3.9\times10^{-1}$ | $2.4\times10^{-1}$ | $2.1\times10^{-1}$ | $1.8\times10^{-1}$ |
| 2 Ethyl hexanol | 1:10 | $1.3\times10^1$ | $6.7\times10^0$ | $3.6\times10^0$ | $1.2\times10^0$ | $4.8\times10^{-1}$ | $6.3\times10^{-1}$ | — | $7.1\times10^{-1}$ | analysed for iridium by atomic absorption spectrophotometry. From the analyses, the concentrations in the organic phase were determined by difference and the distribution coefficients then calculated.

TABLE 7
DISTRIBUTION COEFFICIENTS FOR THE EXTRACTION OF Ir (IV) USING 0.25M ALAMINE 336 IN SOLVESSO 150 IN THE PRESENCE OF MODIFIERS

| MODIFIER | AMINE: MODIFIER MOLAR RATIO | HCl MOLARITY OF SOLUTION | | | | |
|---|---|---|---|---|---|---|
| | | 0.1M | 0.5M | 1.0M | 5.0M | 10.0M |
| None | — | $3.6 \times 10^3$ | $2.4 \times 10^2$ | $1.5 \times 10^2$ | $1.2 \times 10^2$ | $2.4 \times 10^1$ |
| Octan-1-ol | 1:22.3 | $1.1 \times 10^2$ | $2.1 \times 10^1$ | $1.1 \times 10^1$ | $6.8 \times 10^0$ | $6.2 \times 10^0$ |
| Octanoic Acid | 1:20 | $3.3 \times 10^1$ | $6.5 \times 10^0$ | $2.6 \times 10^0$ | $6.4 \times 10^{-1}$ | $9.8 \times 10^{-1}$ |
| 4-nonylphenol | 1:5 | $5.5 \times 10^0$ | $1.3 \times 10^0$ | $5.3 \times 10^{-1}$ | $2.0 \times 10^{-1}$ | $1.3 \times 10^{-1}$ |

Example 7—EFFECT OF MODIFIERS ON THE EXTRACTION OF PALLADIUM (II)

Stock solutions containing 10 gl$^{-1}$ Pd (II) in 0.1, 0.5, 1, 5 and 10 M hydrochloric acid were prepared from sodium tetrachloropalladate (II) and standardised acid. Aliquots of these solutions were contacted with equal volumes of the organic phases listed in Table 8 for two minutes. The aqueous phases were separated and analysed for palladium by atomic absorption spectrophotometry. From the analyses, the concentrations in the organic phase were determined by difference and the distribution coefficients then calculated.

TABLE 8
DISTRIBUTION COEFFICIENTS FOR THE EXTRACTION OF Pd (II) USING 0.3M AMBERLITE LA2 IN SOLVESSO 150 IN THE PRESENCE OF MODIFIERS

| MODIFIER | AMINE MODIFIER MOLAR RATE | HCl MOLARITY OF SOLUTION | | | | |
|---|---|---|---|---|---|---|
| | | 0.1M | 0.5M | 1.0M | 5.0M | 10.0M |
| None | — | $1.9 \times 10^3$ | $1.5 \times 10^2$ | $4.7 \times 10^1$ | $3.8 \times 10^0$ | $7.1 \times 10^{-1}$ |
| Octan-1-ol | 1:6 | $1.2 \times 10^2$ | $7.4 \times 10^0$ | $8.9 \times 10^{-1}$ | $2.8 \times 10^{-1}$ | $1.6 \times 10^{-1}$ |
| Octanoic Acid | 1:4 | $5.9 \times 10^1$ | $1.1 \times 10^1$ | $4.5 \times 10^0$ | $5.4 \times 10^{-1}$ | $3.2 \times 10^{-1}$ |
| 4-nonylphenol | 1:1 | $6.7 \times 10^1$ | $7.3 \times 10^0$ | $2.8 \times 10^0$ | $3.2 \times 10^{-1}$ | $1.9 \times 10^{-1}$ |

I claim:

1. A process for the separation or purification of platinum group metals in which either platinum, iridium (IV) and/or palladium (II) are present in aqueous solution together with at least one of rhodium and ruthenium and one or more base metals comprising the steps of:
   (a) contacting the said aqueous solution of a pH of less than 1 with an organic hydrocarbon extraction solvent containing at least one nitrogen containing organic compound selected from the group consisting of primary, secondary and tertiary amines and quarternary ammonium compounds and at least one oxygen containing organic compound selected from the group consisting of alcohols, phenols and carboxylic acids;
   (b) removing from contact with the said aqueous solution the said organic phase now containing the platinum, iridium (IV) and/or palladium (II) extracted from the aqueous solution together with the nitrogen- and oxygen-containing organic compounds while leaving other platinum group metals and base metals in the aqueous solution; and
   (c) contacting the organic phase obtained at stage (b) above with an aqueous solution of a strong acid and thus stripping the platinum, iridium and/or palladium from the said organic phase and obtaining an aqueous solution of the said metals.

2. A process according to claim 1 wherein the nitrogen containing organic compound used in step (a) is a branched chain secondary amine of general formula $R_2NH$ in which R is aliphatic.

3. A process according to claim 2 wherein R is $C_{12}-C_{14}$ alkyl.

4. A process according to claim 2 wherein the nitrogen containing organic compound in step (a) is equilibrated with an acid before contacting with the acidified solution.

5. A process according to claim 2 wherein the R groups are the same or different and are selected from the group consisting of the normal and iso isomers of hexyl, heptyl, octyl, nonyl, decyl, undecyl and dodecyl alkyl groups.

6. A process according to claim 2 wherein the secondary amines of step (a) are selected from the group consisting of N-dodecyl (trialkylmethyl) amine, N-lauryl (trialkylmethyl) amine, secondary amine mixtures and di-isotridecylamine.

7. A process according to claim 1 wherein the solution of strong acid in step (c) is a strong HCl, HBr or HClO$_4$ solution.

8. A process according to claim 1 wherein the tertiary amines in step (a) have a formula $R_3N$ where R is aliphatic.

9. A process according to claim 8 wherein R is a normal alkyl group having a carbon range $C_6-C_{14}$.

10. A process according to claim 8 wherein the R groups are the same or different and are selected from normal and iso isomers of hexyl, heptyl, octyl, nonyl, decyl, undecyl and dodecyl alkyl groups.

11. A process according to claim 8 wherein the R groups are selected from aromatic and mixed aliphatic aromatic groups.

* * * * *